3,218,315
3H-1,4-BENZODIAZEPIN-2(1H)-ONES
Werner Metlesics, Clifton, and Leo Henryk Sternbach, Upper Montclair, N.J., assignors to Hoffmann-La Roche Inc., Nutley, N.J., a corporation of New Jersey
No Drawing. Filed June 7, 1963, Ser. No. 286,169
15 Claims. (Cl. 260—239.3)

This application is a continuation-in-part of application Serial No. 178,566, filed March 9, 1962, in the names of Werner Metlesics and Leo Henryk Sternbach.

The invention relates to novel amino derivatives of 5-aryl 3H - 1,4 - benzodiazepin - 2(1H) - ones, intermediates therefor, and processes of making the foregoing. More specifically, the invention relates to 5-aryl-3H-1,4-benzodiazepin-2(1H)-ones containing a tertiary amino group in either the 7-position or on the 5-aryl ring moiety.

The novel tertiary amino-containing 5-aryl-3H-1,4-benzodiazepin-2(1H)-ones and derivatives thereof to which the invention relates are selected from the group consisting of compounds of the formula

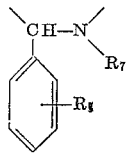

and pharmaceutically acceptable salts thereof; wherein A is selected from the group consisting of

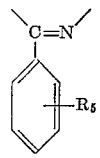

$R_3$, $R_4$ and $R_7$ are selected from the group consisting of hydrogen and lower alkyl; $R_5$ and $R_6$ are selected from the group consisting of

hydrogen, halogen, lower alkoxy, lower alkyl and trifluoromethyl; at least one of $R_5$ and $R_6$ is

and $R_1$ and $R_2$ are selected from the group consisting of, individually, lower alkyl and, taken together with the nitrogen atom, a monoheterocyclic ring containing, at the most, one further hetero atom selected from the group consisting of nitrogen and oxygen.

In a preferred embodiment, when $R_5$ is

it is joined to the aryl nucleus in the 2′ or the 4′ position. In a still more preferred embodiment, when $R_5$ is

it is attached to the aryl nucleus at the 2′ position. It is preferable that compounds of Formula I above include a single tertiary amino group. Thus, when $R_6$ is

it is preferred that $R_5$ be selected from the group consisting of hydrogen, halogen, lower alkoxy, lower alkyl and trifluoromethyl. Moreover, when $R_5$ is

it is preferable that $R_6$ be selected from the group consisting of hydrogen, halogen, lower alkoxy, lower alkyl and trifluoromethyl.

Those compounds wherein A is

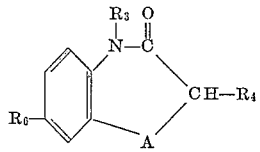

can be referred to as 4,5-dihydro derivatives of those compounds wherein A is

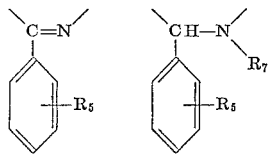

The symbols R have the following significance:

$R_1$ and $R_2$, when individual radicals, represent straight or branched chain lower alkyl groups such as methyl, ethyl, propyl, isopropyl or the like and, when taken together with the nitrogen atom to which they are attached, can form a monoheterocyclic ring containing, at the most, one further hetero atom selected from the group consisting of nitrogen and oxygen. Especially preferred are those monoheterocyclic rings containing 5 to 6 members such as piperidino and morpholino and the like. Thus, the 2 carbon atoms joined to the nitrogen of the amine can respectively form a part of a group which exists independently of the other group. Therefore, such carbon atoms can individually comprise a part of the said straight or branched chain aliphatic radical such as methyl, ethyl, propyl, isopropyl or the like. Alternatively, such carbon atoms can comprise part of a divalent radical, and such radicals can combine with each other directly or through the said, at the most, one further hetero atom to form a group such pentamethylene and ethyleneoxyethylene.

$R_3$, $R_4$ and $R_7$ represent either hydrogen or straight or branched chain lower alkyl such as methyl, ethyl, propyl, isopropyl and the like.

$R_5$ and $R_6$ are either

hydrogen, lower alkoxy such as methoxy and the like, lower alkyl such as methyl and the like, trifluoromethyl or halogen. The term "halogen" includes all four halides, and especially preferred is chlorine.

In addition to the compounds within the scope of Formula I above, there are also encompassed within this invention the pharmaceutically acceptable salts of said compounds. The compounds of Formula I form pharmaceutically acceptable acid addition salts with pharmaceutically acceptable organic and inorganic acids such as hydrochloric acid, hydrobromic acid, sulfuric acid, phosphoric acid, nitric acid, tartaric acid, citric acid, camphor sulfonic acid, ethane sulfonic acid, toluene sulfonic acid, ascorbic acid, salicylic acid, maleic acid, succinic acid, mandelic acid, formic acid, acetic acid and the like. Also, inasmuch as the nitrogen atom of the amino group found in compounds of Formula I above is a tertiary amino nitrogen atom, compounds of Formula I above form pharmaceutically acceptable quaternary ammonium salts with conventional quaternizing agents such as lower alkyl halides, lower alkyl sulfates, aralkyl halides and aralkyl sulfates.

The compounds of Formula I above can be prepared by a variety of methods.

One method for preparing compounds for the formula 7-($R_1R_2N$)-1-$R_3$-3-$R_4$-5-($R_5$-phenyl)-3H-1,4-benzodiazepin-2(1H)-ones wherein $R_1$, $R_2$, $R_3$, $R_4$ and $R_5$ have the same meaning as ascribed thereto hereinabove utilizes 5-halo-2-nitrobenzophenone as a starting material. These compounds are not part of this invention but are disclosed hereinbelow in order that the present disclosure may be complete. These 5-halo-2-nitrobenzophenones, upon treatment with the appropriate secondary amine, yield compounds of the formula

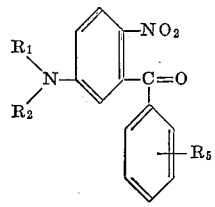

wherein $R_1$, $R_2$ and $R_5$ have the same meaning as above.

This reaction can be conducted either in conventional inert organic solvents, such as ethanol, dioxane or the like. Also, the amine being reacted, such as dimethylamine, piperidine, morpholine, or the like, can itself serve as the reaction medium. The treatment is preferably carried out at an elevated temperature.

In a second step of the above method, the so-obtained 5-(N-substituted-amino)-2-nitrobenzophenone is reduced to the corresponding 5-(N-substituted-amino)-2-aminobenzophenone. This reduction can conveniently be effected via hydrogenation in the presence of a hydrogenation catalyst, such as Raney nickel, and in the presence of a conventional inert organic solvent, such as ethanol, or the like.

One method for preparing compounds of the formula of 7-$R_6$-5($R_1R_2$N-phenyl)-1-$R_3$-3-$R_4$-3H-1,4-benzodiazepin-(1H)-ones wherein $R_1$, $R_2$, $R_3$, $R_4$ and $R_6$ have the same meaning as ascribed thereto hereinabove involves utilization of 2-aminobenzophenones having the formula of

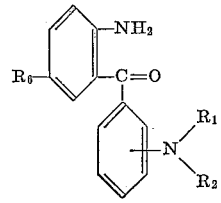

II wherein $R_1$, $R_2$ and $R_6$ have the meanings ascribed thereto hereinabove.

In a preferred embodiment, the

is joined to the benzophenone at the 2' or the 4' position. In a still more preferred embodiment, the

grouping is joined to the benzophenone at the 2' position.

The 5-(N-substituted-amino)-2-aminobenzophenone and the compounds of Formula II above can thereafter be treated to form the compounds corresponding to Formula I above. The 2-aminobenzophenones can be isolated in the form of a mineral salt and can then be reacted with an α-amino acid to directly prepare compounds of Formula I above wherein A is

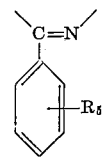

In those compounrs wherein $R_4$ is hydrogen, the α-amino acid utilized is glycine. Where $R_4$ is lower alkyl, α-amino acids having the formula $R_4$—CH($NH_2$)—COOH are used to introduce the group $R_4$ into the final compound. Alanine, for example, is exemplary of such α-amino acids. In the preferred embodiment, the reaction of the 2-aminobenzophenones with an α-amino acid is carried out with an α-amino acid ester such as a lower alkyl ester of an α-amino acid and is preferably effected in the presence of an inert organic solvent such as pyridine, dimethylformamide or the like. It is also preferable to utilize one of the materials or a fraction thereof present in the form of the salt of a strong organic or inorganic acid such as glycine hydrochloride, glycine ethyl ester hydrochloride, pyridine hydrochloride or the like.

In an alternate method for the preparation of compounds corresponding to Formula I above, the 5-(N-substituted amino)-2-aminobenzophenone described above, or the compounds corresponding to Formula II above, are reacted with an α-halo-lower alkanoyl halide to form either a 5-(N-substituted amino)-2-(α-halo lower alkanoylamino)-benzophenone or a 2-(α-halo lower alkanoylamino)-benzophenone having a tertiary amino group in the prime position which can then be reacted with ammonia to yield the final product of Formula I above wherein A is

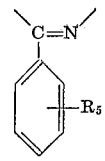

Compounds of Formula I above wherein A is

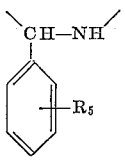

i.e. the 4,5-dihydro derivatives, can be prepared from compounds of Formula I above wherein A is

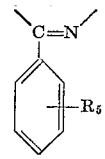

by reduction. For example, the latter compounds can be reduced with hydrogen in the presence of a hydrogenation catalyst such as platinum oxide to yield the former compounds.

Another method for preparing compounds of Formula I above wherein $R_6$ is a tertiary amino group comprises the reductive alkylation of a compound of the formula

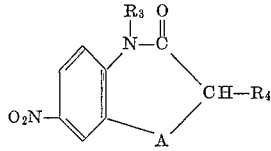

wherein A, $R_3$ and $R_4$ have the same meaning as above.

This reductive alkylation is preferably conducted using hydrogen as a reducing agent in the presence of a hydrogenation catalyst such as Raney nickel. In a preferred embodiment of the invention, to obtain compounds of Formula I above wherein $R_1$ and $R_2$ are both methyl, formaldehyde is used as the alkylating agent. This reductive alkylation can be conducted at room temperature or elevated temperatures, and is preferably conducted in the presence of conventional inert organic solvents such as methanol, ethanol or the like.

Compounds of Formula I above wherein $R_3$ is lower alkyl can be derived from compounds of Formula III above wherein $R_3$ is lower alkyl; compounds of Formula I above wherein $R_3$ is lower alkyl can alternatively be prepared via condensation of 2-lower alkylaminobenzophenones prepared from the above described 2-amino-benzophenones.

Compounds of Formula I above wherein $R_3$ is lower alkyl can be prepared from corresponding compounds of Formula I above wherein $R_3$ is hydrogen by forming the alkali metal salt thereof and reacting such salt with dilower alkyl sulfate, lower alkyl halide or similar alkylating agents in an inert organic solvent medium such as ether, benzene, alcohol, dimethylformamide, dioxane or the like, preferably at room temperature or below. Compounds of Formula I above wherein $R_7$ is lower alkyl can be prepared similarly from compounds of Formula I above wherein $R_7$ is hydrogen by reacting the latter with an alkylating agent of the type specified immediately hereinabove in the presence of an inert organic solvent. For example, a compound of Formula I above wherein $R_7$ is hydrogen can be reacted with a sodium alkylate to form a sodio derivative of the former, and this derivative can be reacted with an alkylating agent such as a lower alkyl halide to form a compound corresponding to Formula I above wherein $R_7$ is lower alkyl.

The compounds of Formula I above are useful as sedatives, muscle relaxants and anticonvulsants. The compounds of Formula I, their pharmaceutically acceptable acid addition salts, and their pharmaceutically acceptable quaternary ammonium salts, can be administered internlly, i.e. parenterally or enterally, by incorporating therapeutic dosages in conventional pharmaceutical liquid or solid vehicles to provide elixirs, suspensions, tablets, capsules and the like according to accepted pharmaceutical practice.

The following examples are illustrative but not limitative of the invention. All temperatures are in degrees centigrade.

*Example 1*

To a solution of 10 g. of 5-chloro-2-nitrobenzophenone in 150 ml. of ethanol was added a solution of approximately 22 g. of dimethylamine in 100 ml. of ethanol. The mixture was heated in an autoclave under nitrogen atmosphere to 110° for 24 hours. The alcoholic solution was concentrated in vacuo and cooled. Yellow needles of 5-dimethylamino-2-nitrobenzophenone separated which were collected on a filter and after recrystallization from alcohol melted at 130–132°.

The above-mentioned 5-chloro-2-nitrobenzophenone is not a part of this invention, but its preparation is disclosed hereinbelow in order that the present disclosure may be complete.

A suspension of 10.8 cc. of 90% hydrogen peroxide in 250 cc. of methylene chloride contained in a 1-liter flask fitted with a stirrer, reflux condenser and a dropping funnel was cooled with an ice bath. Trifluoroacetic anhydride (67.6 cc., 100 g.) was added over 45 minutes. After stirring for 5 minutes longer, the ice bath was removed and a solution of 23.2 g. of 2-amino-5-chlorobenzophenone in 100 cc. of methylene chloride was added over 45 minutes. The resulting warm, dark solution was stirred and refluxed (steam bath) for 1 hour. After cooling with a cold water bath, the reaction mixture was washed successively with two 200 cc. portions of ice water, two 200 cc. portions of cold 10% sodium carbonate and finally with 200 cc. of 10% sodium chloride solution. Emulsions were broken by filtration through a thin pad of diatomaceous earth. The methylene chloride solution was dried over magnesium sulfate and evaporated in vacuo (50°) leaving a thick oily residue which soon crystallized exothermically yielding 2-nitro-5-chlorobenzophenone which upon recrystallization from 30 cc. of methanol melted at 87–89°.

*Example 2*

A solution of 3 g. of 5-chloro-2-nitrobenzophenone in 50 ml. of piperidine was refluxed for 72 hours. Excess piperidine was removed in vacuo. The residue was dissolved in a mixture of water and ether. The ether phase was dried and on evaporation yielded orange needles of 2-nitro-5-piperidinobenzophenone, which after recrystallization from a mixture of benzene and hexane melted at 109–111°.

*Example 3*

A solution of 3 g. of 5-chloro-2-nitrobenzophenone in 50 ml. of morpholine was refluxed for 18 hours. Excess morpholine was removed in vacuo yielding an oil which was poured into ice water. Crystals formed which were collected on a filter and recrystallized from methanol. Yellow leaflets of 5-morpholino-2-nitrobenzophenone melting at 152–154° were obtained.

*Example 4*

A mixture of 6.2 g. of 2-nitro-5-piperidinobenzophenone, 1500 ml. of ethanol and approximately 0.5 g. of Raney nickel was shaken at 25° and normal pressure under an atmosphere of hydrogen. The uptake was 1450 ml. of hydrogen (ca 0.06 mole). After filtering from the catalyst the solution was concentrated in vacuo to a volume of 100 ml. and 15 ml. of a 4 N solution of hydrogen chloride in ethanol was added. Slow addition of ether to this solution precipitated crystals of 2-amino-5-piperidinobenzophenone monohydrochloride, which upon recrystallization from a mixture of ethanol and ether yielded yellow needles melting at 227–240° (dec.).

*Example 5*

A mixture of 5g. of 2-amino-5-piperidinobenzophenone monohydrochloride and 35 g. of glycine ethyl ester hydrochloride was refluxed for 17 hours in 100 ml. of pyridine. The pyridine was removed in vacuo and the residue stirred with water. The solid was collected on a filter and recrystallized from ethanol. Yellow prisms of 5-phenyl-7-piperidino-3H-1,4-benzodiazepin-2(1H)-one melting at 250–252° where obtained.

*Example 6*

To a solution of 56 g. of 7-nitro-5-phenyl-3H-1,4-benzodiazepin-2(1H)-one in 800 ml. of methanol was added 80 ml. of a 37% aqueous solution of formaldehyde and ca. 8 g. of Raney nickel. This mixture was shaken for 22 hours and ca. 20 atm. of hydrogen pressure. The solution was filtered from the catalyst and concentrated yielding yellow needles of 7 - dimethylamino - 5-phenyl-3H-1,4-benzodiazepin-2-(1H)-one, which upon recrystallization from ethyl acetate gave crystals melting at 245–247°.

The above-mentioned 7-nitro-5-phenyl-3H-1,4-benzodiazepin-2(1H)-one is not a part of this invention but its preparation is disclosed hereinbelow in order that the present disclosure may be complete.

A mixture of 16.8 g. of 2-aminobenzophenone, 11.9 g. of glycine ethyl ester hydrochloride and 200 cc. of pyridine was heated to reflux. After one hour, 20 cc. of pyridine was distilled off. The solution was refluxed for 15 hours, then 11.9 g. of glycine ethyl ester hydrochloride was added and the refluxing was continued for an additional 4 hours. The reaction mixture was concentrated in vacuo, then diluted with ether and water. The reaction product, 5-phenyl-3H-1,4-benzodiazepin-2(1H)-one, crystallized out, was filtered off and then recrystallized from acetone in the form of colorless rhombic prisms, M.P. 182–183°.

48 g. of 5-phenyl-3H-1,4-benzodiazepin-2(1H)-one was dissolved in 250 cc. of concentrated sulfuric acid by stirring at 15° for ½ hour. The solution was then cooled to 0° and a mixture of 9.1 cc. of fuming nitric acid (90%—sp. gr.=1.50) and 11.8 cc. of concentrated sulfuric acid was added dropwise with stirring, keeping the temperature of the reaction mixture between —5° and 0°. After completion of the addition of the nitric acid-sulfuric acid mixture, stirring was continued for 1 hour and the reaction mixture was stored in the refrigerator overnight.

The mixture was then added dropwise to 2 kg. of crushed ice with stirring and cooling, keeping the temperature at 0°. After 1 hour of stirring in the cold, 640 cc. of concentrated ammonium hydroxide was added dropwise at 0° to pH 8. Stirring was continued for ½ hour and the crude product was filtered off, washed with a small amount of ice water and sucked dry overnight. The crude product was suspended in a mixture of 100 cc. of methylene chloride and 1700 cc. of alcohol. 50 g. of decolorizing charcoal was added and the mixture was refluxed with stirring for 2 hours. After standing overnight at room temperature 15 g. of diatomaceous filter aid was added and the refluxing was resumed for 1½ hours. The mixture was filtered while hot. The clear, light yellow filtrate was concentrated in vacuo on the steambath with stirring to about 600 cc. The concentrate was stirred and cooled in ice for about 2 hours; the precipitated crystalline product was filtered off, washed with some petroleum ether and sucked dry. The product, 7-nitro-5-phenyl-3H-1,4-benzodiazepin - 2(1H) - one, was recrystalized from a mixture of 1000 cc. of alcohol and 50 cc. of methylene chloride to obtain white prisms melting at 224–225°.

*Example 7*

To a solution of 25 g. of 1-methyl-7-nitro-5-phenyl-3H-1,4-benzodiazepin-2(1H)-one in 600 ml. of methanol was added 50 ml. of a 37% solution of aqueous formaldehyde and ca. 8 g. of Raney nickel. This mixture was shaken under an initial pressure of 8 atm. hydrogen. After 2 to 3 hours the theoretical amount (5 moles of hydrogen per mole of substance) had been taken up and the pressure remained constant. The solution was filtered from the catalyst and the main amount of methanol was removed in vacuo. Yellow prisms of 7-dimethylamino - 1-methyl-5-phenyl-3H-1,4-benzodiazepin-2(1H)-one separated which after recrystallization for a mixture of ethanol, ether and hexane melted at 141–143°.

The above-mentioned 7-nitro-1-methyl-3H-1,4-benzodiazepin-2(1H)-one, intermediates therefor and the preparation thereof, are not a part of this invention, but such are set forth hereinbelow in order that the present disclosure may be complete.

5.6 g. of 7-nitro-5-phenyl-3H-1,4-benzodiazepin-2(1H)-one was suspended in 75 cc. of methanol. 1.1 g. (0.022 mol) of sodium methylate was added with stirring. The clear yellow-brown solution was concentrated to dryness in vacuo giving the yellow sodio derivative. This sodio derivative was dissolved in 70 cc. of dimethylformamide. 3.8 cc. (8.52 g.=0.06 mol) of methyl iodide was added dropwise, the temperature rising to 30°. The reaction mixture was cooled and stirred for 1½ hours. The clear brown solution was added to about 500 cc. of ice and water with stirring. The fine yellow precipitate was filtered off, washed with ice water, sucked dry and dried in vacuo at 50° over sodium hydroxide. The pure 1-methyl-7 - nitro-5-phenyl-3H-1,4-benzodiazepin-2(1H)-one crystallized in needles from dilute ethanol and melted at 156–157°.

*Example 8*

A solution of 5 g. of 7-dimethylamino-5-phenyl-3H-1,4-benzodiazepin-2(1H)-one in 100 ml. of acetic acid was hydrogenated with 0.3 g. of platinum oxide at 25° and 1 atm. After 2 hours the uptake of hydrogen had stopped and the solution was filtered from the catalyst. On neutralization with aqueous ammonia a white solid precipitated which was collected on a filter. Dissolving in hot ethanol and cooling produced crystals of 4,5-dihydro-7-dimethylamino-5-phenyl-3H-1,4 - benzodiazepin - 2(1H)-one which after recrystallization from the same solvent yielded white platelets melting at 174–176°.

*Example 9*

A solution containing 5.6 g. of 7-dimethylamino-1-methyl-5-phenyl-3H-1,4-benzodiazepin-2(1H)-one and 10 g. of methyl bromide in 60 ml. of acetone was kept at room temperature for 24 hours. After this time brown crystals had separated which were collected on a filter. Recrystallization from methanolether gave colorless prisms of (1,2-dihydro-1-methyl-2-oxo-5-phenyl-3H-1,4 - benzodiazepin-7yl)trimethylammonium bromide melting at 190° (dec.).

*Example 10*

To a solution of 10 g. of 5(2-chlorophenyl)-7-nitro-3H-1,4-benzodiazepin-2(1H)-one in 275 ml. of methanol was added 20 ml. of a 37% aqueous solution of formaldehyde and ca. 5 g. of Raney nickel. This mixture was shaken over night under an initial pressure of 5–6 atm. of hydrogen. The solution was filtered from the catalyst and evaporated in vacuo. The residue was recrystallized from ethyl acetate to yield yellow needles of 5-(2-chlorophenyl)-7-dimethylamino-3H-1,4-benzodiazepin - 2(1H)-one melting at 245–248°.

The above mentioned 7-nitro-5-(2-chlorophenyl)-3H-1,4-benzodiazepin-2(1H)-one, intermediates therefor and the preparation thereof, are not a part of this invention, but such are set forth hereinbelow in order that the present disclosure may be complete.

A stirred solution of 75 g. of 2-amino-2'-nitrobenzophenone in 700 ml. of hot concentrated hydrochloric acid was cooled to 0° and a solution of 21.5 g. of sodium nitrite in 50 ml. of water was added in the course of 3 hours. The temperature of the suspension was kept at 2–7° during the addition. The resulting clear solution was poured into a stirred solution of 37 g. of cuprous chloride in 350 ml. of hydrochloric acid 1:1. The solid which had formed after a few minutes was filtered off, washed with water and recrystallized from ethanol. Crystals of 2-chloro-2'-nitrobenzophenone melting at 76–79° were obtained.

A solution of 20 g. of 2-chloro-2'-nitrobenzophenone in 450 ml. of ethanol was hydrogenated at normal pressure and room temperature with Raney nickel. After uptake of ca. 6 liters of hydrogen the catalyst was filtered off, and the alcohol then removed in vacuo. The residue was distilled in a bulb tube at 0.4 mm. and a bath temperature of 150–165° giving a yellow oil. The oil was dissolved in alcohol, and on addition of water, needles of 2-amino-2'-chlorobenzophenone melting at 58–60° were obtained.

To a solution of 42 g. of 2-amino-2'-chlorobenzophenone in 500 ml. of benzene, 19 ml. of bromoacetyl bromide was added dropwise. After refluxing for 2 hours, the solution was cooled, washed with 2 N sodium hydroxide and evaporated. The residue was recrystallized from methanol giving crystals of 2-bromo-2'-(2-chlorobenzoyl) acetanilide melting at 119–121°.

To a solution of 14.5 g. of 2-bromo-2'-(2-chlorobenzoyl)-acetanilide in 100 ml. of tetrahydrofuran, an excess of liquid ammonia (ca. 150 ml.) was added. The ammonia was kept refluxing with a Dry-Ice condenser for 3 hours after which time the ammonia was allowed to evaporate and the solution was poured into water. Crystals of 2-amino-2'-(2-chlorobenzoyl) acetanilide were collected, which after recrystallization from ethanol melted at 162–164°.

A solution of 3 g. of 2-amino-2'-(2-chlorobenzoyl)-acetanilide in 50 ml. of pyridine was refluxed for 24 hours after which time the pyridine was removed in vacuo. The residue was recrystallized from methanol and a mixture of dichloromethane and ether giving crystals of 5-(2- chlorophenyl)-3H-1,4-benzodiazepin-2(1H) - one melting at 212–213°.

To a solution of 13.5 g. of 5-(2-chlorophenyl)-3H-1,4-benzodiazepin-2(1H)-one in 60 ml. of concentrated sulfuric acid, a solution of 5.5 g. of potassium nitrate in 20 ml. concentrated sulfuric acid was added dropwise. The solution then was heated in a bath at 45–50° for 2½ hours, cooled and poured on ice. After neutralizing with ammonia, the formed precipitate was filtered off and boiled with ethanol. A small amount of white insoluble material was then filtered off. The alcoholic solution on concentration yielded crystals of 7-nitro-5-(2-chlorophenyl)-3H-1,4-benzodiazepin-2(1H)-one which, after recrystallization from dichloromethane, melted at 238–240°.

*Example 11*

To a solution of 35 g. of 7-nitro-5-(α,α,α-trifluoro-o-tolyl)-3H-1,4-benzodiazepin-2(1H) - one in 800 ml. of methanol was added 50 ml. of a 37% aqueous solution of formaldehyde and ca. 8 g. of Raney nickel. This mixture was shaken over night under an initial pressure of ca. 20 atm. of hydrogen. The solution was filtered from the catalyst and evaporated in vacuo. The residue was recrystallized from methanol to yield yellow needles of 7-dimethylamino-5-(α,α,α-trifluoro-o-tolyl)-3H-1,4 - benzodiazepin-2(1H)-one melting at 254–256°.

The above-mentioned 7-nitro-5-(α,α,α-trifluoro-o-tolyl)-3H-1,4-benzodiazepin-2(1H)-one, intermediates therefor and the preparation thereof, are not a part of this invention, but such are set forth hereinbelow in order that the present disclosure may be complete.

A solution of o-trifluoromethyl phenyl magnesium bromide was prepared in the usual manner from 50.0 g. of o-bromo-benzotrifluoride, 5.55 g. of magnesium and 110 ml. of anhydrous ether. The Grignard reagent can also be prepared by reacting 39.7 g. of o-chlorobenzotrifluoride with 5.55 g. of magnesium in tetrahydrofurane. This solution was added with stirring at 20° C. over a period of 3 hours to a solution of 33.0 g. of 2-methyl-4H-3,1-benzoxazin-4-one in 300 ml. of methylene chloride. The resulting dark but clear solution was left at room temperature for 16 hours and was then poured over a mixture of 50 g. of ammonium chloride and 600 g. of crushed ice. Extraction with ether gave a crude reaction product which was directly hydrolyzed by refluxing for one hour in a mixture of 240 ml. of ethanol and 240 ml. of 3 N sodium hydroxide. After standing overnight, the reaction mixture was extracted with ether. The ether layer was washed with water and concentrated in vacuo yielding an oil. This was purified in two portions by chromatography on the 20-fold amount of neutral alumina (activity grade III; e.g. containing 6% of water). Elution with petroleum ether (60–70°) and a mixture of petroleum ether (60–70°) and ether (9:1) followed by crystallization from a mixture of ether and hexane yielded 2-amino-2'-trifluoromethylbenzophenone, melting at 94–96° (yellow prisms).

To a solution of 5.0 g. of 2-amino-2'-trifluoromethylbenzophenone in 25 ml. of anhydrous ether, cooled to 0° C., 1.7 ml. of bromoacetylbromide was added with stirring; a precipitation occurred and the yellow color of the solution gradually faded. The suspension containing 2 - bromoacetamido-2'-trifluoromethylbenzophenone (not isolated) was stirred for half an hour at 0° C. and for two hours at room temperature. After that, 25 ml. of liquid ammonia was condensed into the flask, by introducing ammonia gas and using an efficient Dry Ice-acetone condenser. The resulting mixture was stirred and refluxed (B.P. of liquid ammonia) for 3 hours. After taking off the condenser, the ammonia was allowed to evaporate overnight. The reaction mixture was extracted with ether (the ether layers being washed 3 times with water) and yielded crude 2-amino-2'-(2-trifluoromethylbenzoyl) acetanilide. Recrystallization from a mixture of 15 ml. of benzene and 15 ml. of hexane gave the pure product, melting at 141–142° C. (colorless, rhombic plates).

3.0 g. of 2-amino-2'-(2-trifluoromethylbenzoyl) acetanilide was heated in an open tube for 15 minutes to 200–205° C., using an oil bath. Water was given off. On cooling, a brown glass was obtained which, on crystallization from a mixture of methanol and ether, gave crude 5 - (2 - trifluoromethylphenyl) - 3H - 1,4 - benzodiazepin-2(1H)-one. The mother liquor was evaporated to dryness, dissolved in benzene and chromatographed on 60 g. of neutral alumina (activity grade III, e.g. containing 6% of water). Elution with benzene (300 ml.) gave a product which could be crystallized to give some starting material. Then, with a benzene-ether-(1:1)-mixture (400 ml.), a crude product could be eluted. This, on crystallization from ether-hexane, gave the pure 5-(2-trifluoromethylphenyl) - 3H-1,4-benzodiazepin -2 (1H)-one, melting at 187–188° (almost colorless prisms).

7.3 g. of 5-(2-trifluoromethylphenyl)-3H-1,4-benzodiazepin-2(1H)-one were dissolved at 0° in 58.4 ml. of concentrated sulfuric acid. To this, over a period of about 15 minutes, 3.22 g. of potassium nitrate were added with stirring. After keeping the reaction mixture for 30 minutes at 0°, it was allowed to stand for one hour at 25°. Finally, it was heated to 50° for 3 hours. After standing overnight at 25°, the yellow solution was poured over 250 g. of ice and the precipitate obtained, filtered and thoroughly washed with diluted ammonium hydroxide solution, diluted acetic acid and water. Crystallization from acetone-benzene of the thus-obtained crude product afforded the 7-nitro-5-(2'-trifluoromethylphenyl) - 3H-1,4-benzodiazepin - 2(1H)-one. From the mother liquor and the filtrate, a second crop could be obtained. An analytical sample was prepared by recrystallization from acetone-methanol. Slightly yellow prisms (hexagonal), melting at 233–234°, were obtained.

*Example 12*

To a solution of 6 g. of 5-(2-chlorophenyl)-7-dimethylamino-3H-1,4-benzodiazepin-2(1H)-one in 100 ml. of dimethylformamide 1.25 g. of solid sodium methoxide was added with stirring. The mixture was cooled to 0° and a solution of 4 g. of methyl iodide in 50 ml. of dimethylformamide was added dropwise. The temperature was maintained between 0° and 10°. The excess of methyl iodide was removed in vacuo without heating and the solution was poured into ice water. The aqueous phase was extracted with ether, the ether was washed with water, dried and evaporated. The residue crystallized on addition of hexane and was recrystallized from a mixture of ether and hexane. Yellow prisms of 5-(2-chlorophenyl) - 7-dimethylamino-1-methyl-3H-1,4-benzodiazepin-2(1H)-one were obtained melting at 110–115°.

Example 13

To a solution of 4 g. of 7-dimethylamino-5-($\alpha,\alpha,\alpha$-trifluoro-o-tolyl)-3H-1,4-benzodiazepin-2(1H)-one in 50 ml. of dimethylformamide was added 0.6 g. of a 50% suspension of sodium hydride in mineral oil. The mixture was stirred and heated on a steam-bath to complete the reaction. After cooling to 0° a solution of 4.2 g. of methyl iodide in 25 ml. of dimethylformamide was added dropwise so that the temperature did not rise above 10°. After 30 minutes the excess of methyl iodide was removed in vacuo without heating and the solution was poured into ice water. The aqueous solution was extracted with ether, the ether was washed with water, dried and evaporated. The residue crystallized on addition of hexane and was recrystallized from a mixture of ether and cyclohexane. Yellow prisms of 7-dimethylamino-1-methyl-5-($\alpha,\alpha,\alpha$-trifluoro-o-tolyl) - 3H-1,4-benzodiazepin-2(1H)-one melting at 110–115° were obtained.

Example 14

To a solution of 7.3 g. of 1-methyl-7-nitro-5-($\alpha,\alpha,\alpha$-trifluoro-o-tolyl) - 3H-1,4-benzodiazepin - 2(1H)-one in 275 ml. of methanol was added 25 ml. of a 37% aqueous solution of formaldehyde and ca. 4 g. of Raney nickel. This mixture was shaken for 4 hours and at an initial pressure of 14 atm. hydrogen. The resulting solution was filtered from the catalyst and the methanol then evaporated in vacuo. The residue was dissolved in ether and dried with sodium sulfate. On addition of cyclohexane, crystals of 7-dimethylamino-1-methyl-5-($\alpha,\alpha,\alpha$-trifluoro-o-tolyl)-3H-1,4-benzodiazepin-2(1H)-one were obtained which after recrystallization from a mixture of ether and cyclohexane melted at 110–115°.

The above-mentioned 1-methyl-7-nitro-5-($\alpha,\alpha,\alpha$-trifluoro-o-tolyl)-3H-1,4-benzodiazepin-2(1H)-one, its preparation and intermediates therefor, are not a part of the instant invention, but such are disclosed hereinbelow in order that the present disclosure may be complete.

4.97 g. of 7-nitro-5-(2-trifluoromethyl-phenyl)-3H-1,4-benzodiazepin-2(1H)-one was dissolved in a cold solution of sodium methoxide obtained from 350 mg. of sodium and 50 ml. of anhydrous methanol. The solution was stirred at room temperature for 30 minutes after which 5 ml. of methyl iodide was added and stirring continued for 3 hours. The solution was then permitted to stand at —15° for several hours during which time a crystalline precipitate formed. The precipitate was filtered off, washed with water and with ether, and crystallized from acetone to yield 1 - methyl - 7-nitro-5-(2-trifluoromethylphenyl) - 3H - 1,4 - benzodiazepin - 2(1H)-one as almost colorless prisms melting at 198–199° C.

Example 15

A solution of 8.8 g. of 7-dimethylamino-1-methyl-5-phenyl-3H-1,4-benzodiazepin-2(1H)-one in 150 ml. of acetic acid was hydrogenated with 0.3 g. of platinum oxide at 25° and 1 atm. After 1 hour the uptake of hydrogen had stopped and the solution was filtered from the catalyst. On neutralization with sodium hydroxide white flocks separated which were extracted with dichloromethane. The organic phase was washed with water and dried over sodium sulfate. After evaporation of the dichloromethane the residue was recrystallized twice from ethanol yielding 4,5-dihydro-7-dimethylamino-1-methyl-5-phenyl-3H-1,4-benzodiazepin-2(1H)-one as white prisms melting at 152–154°.

Example 16

To a solution of 8 g. of 2′,5-dichloro-2-nitrobenzophenone in 175 ml. of ethanol there was added a solution of app. 5 g. of dimethylamine in 25 ml. of ethanol. The mixture was heated in an autoclave under nitrogen atmosphere to 90° for 20 hours and the resulting solution concentrated in vacuo and cooled. Yellow prisms of 2′-chloro-5-dimethylamino-2-nitrobenzophenone separated and were collected on a filter and, after recrystalliation from methanol, melted at 156–158°.

The above-mentioned 2′,5 - dichloro - 2-nitrobenzophenone, its preparation and intermediates therefor, are not a part of the instant invention, but such are disclosed herein below in order that the present disclosure may be complete.

A mixture of 10.8 cc. of 90% hydrogen peroxide and 250 cc. of methylene chloride contained in a 1-liter flask fitted with a stirrer, reflux condenser and a dropping funnel was cooled with an ice bath. Trifluoroacetic anhydride (67.6 cc., 100 g.) was then added over 45 minutes and after stirring for 5 minutes longer, the ice bath was removed and a solution of 26.6 g. of 2-amino-2′,5-dichlorobenzophenone in 100 cc. of methylene chloride was added over 45 minutes. The resulting warm, dark solution was stirred and refluxed (steambath) for 1 hour. After cooling with a cold water bath, the reaction mixture was washed successively with two 200 cc. portions of ice water, two 200 cc. portions of cold 10% sodium carbonate and finally with 200 cc. of 10% sodium chloride solution. Emulsions were broken by filtration through a thin pad of diatomaceous earth. The methylene chloride solution was dried over magnesium sulfate and evaporated in vacuo (50°) leaving a thick oily residue which soon crystallized exothermically. Recrystallized first from 425 cc. of ethanol (with use of decolorizing charcoal) and then a second time from 255 cc. of ethanol (with use of decolorizing charcoal), the product, $\alpha$ - nitro - 2′,5 - dichlorobenzophenone, melted at 110–112°.

Example 17

A solution containing 5 g. of 5-chloro-2-nitrobenzophenone and 22 g. of diethylamine in 50 ml. of ethanol was heated in an autoclave to 135–140° for 24 hours. The alcoholic solution was concentrated in vacuo and cooled. On addition of a small amount of water, yellow prisms of 5-diethylamino-2-nitrobenzophenone separated and after recrystallization from a mixture of ethanol and water melted at approximately 70°.

Example 18

A mixture of 15.8 g. of 2-amino-5-chloro-2′-piperidinobenzophenone and 21 g. of glycine ethyl ester hydrochloride was refluxed for 18 hours in 100 ml. of pyridine containing 1 ml. of piperidine. Approximately 75 ml. of pyridine was removed by distillation and the residue was then cooled and partitioned between methylene chloride (100 ml.) and water (1 l.). The methylene chloride layer was washed with water (3 x 100 ml.). The solvents were then removed under reduced pressure. The residual oil was crystallized from methanol to give 7-chloro-1,3-dihydro - 5-(2-piperidinophenyl)-2H-1,4-benzodiazepin-2-one, melting at 239–240°.

The above-mentioned 2-amino-5-chloro-2′-piperidinobenzophenone and the process of making the same are not a part of the present invention, but their preparation is set forth hereinbelow in order that this disclosure may be complete.

A solution of 25 g. of 2-amino-5-chloro-2′-fluorobenzophenone in 100 ml. of piperidine was refluxed for 24 hours and then evaporated under reduced pressure to an oil. The residue was then continuously extracted with boiling hexane until only a small amount of dark insoluble material remained. The hexane extracts were combined and treated with decoloring charcoal, filtered, concentrated and cooled, yielding 2-amino-5-chloro-2′-piperidinobenzophenone as bright yellow prisms. Recrystallization of a small portion of the product from hexane yielded a purified sample melting at 110–114°.

Example 19

A solution of 17.6 g. of 2-amino-5-chloro-2′-dimethylaminobenzophenone and 15.5 g. of bromoacetyl bromide in 200 ml. of benzene was refluxed for 90 minutes. 100 cc. of water was added and the mixture was cooled. The layers were separated and the organic layer was washed with water, 30 percent (w./w.) sodium carbonate, water, and saturated brine. The washed layer was dried over anhydrous sodium sulfate and filtered. The benzene solution was concentrated to about 40 ml. and cooled, yielding 2 - bromoacetamido-5-chloro-2'-dimethylaminobenzophenone. Recrystallization of the product from methanol gave yellow prisms, M.P. 106–107°.

A solution of 10.6 g. of 2-bromoaceamido-5-chloro-2'-dimethylaminobenzophenone in 50 ml. of tetrahydrofuran was cautiously added to 200 ml. of liquid ammonia and allowed to stand for 40 minutes. The ammonia was then evaporated on a steam bath and the residue diluted with 1 l. of water. The product was dissolved in 200 ml. of ethanol, refluxed for 16 hours, concentrated to a small volume and allowed to cool. The resulting product was filtered and recrystallized from acetone to give 7-chloro-5 - (2 - dimethylaminophenyl) -3 H - 1,4 - benzodiazepin-2(1H)-one, M.P. 240–241.5°.

The above - mentioned 2-amino-5-chloro-2'-dimethylaminobenzophenone and the process of making the same are not part of the present invention, but such is disclosed herein in order that the description may be complete.

A mixture of 20 g. of 2-amino-5-chloro-2'-fluorobenzophenone, 71 ml. of an ethanolic solution of dimethylamine and 300 ml. of ethanol was heated in an autoclave at 110° for 24 hours (inital pressure 100 p.s.i. of $N_2$, maximum pressure 210 p.s.i.). The cooled solution was concentarted to an oil under reduced pressure, dissolved in ether, washed with water and extracted into 9 N hydrochloric acid (4 x 100 ml.). The acid extracts were combined, washed with ether (2 x 100 ml.), made basic with 10 N sodium hydroxide and the precipitated oil extracted into dichloromethane (3 x 100 ml.). The combined organic layers were washed with water, dried over sodium sulfate and concentrated yielding 2-amino-5-chloro-2'-dimethylaminobenzophenone as a bright yellow oil. An ether solution of the product was filtered over 50 g. of alumina, concentrated, and slowly crystallized from a hexane-ether mixture, yielding yellow prisms melting at 85–86°.

*Example 20*

To a solution of 4.0 g. of 7-chloro-5-(2-dimethylaminophenyl)-3H-1,4-benzodiazepin-2(1H)-one in 30 ml. of dimethylformamide was added, with stirring, a solution of 0.825 g. of sodium methoxide in 3 ml. of methanol. The mixture was cooled to 0° and a solution of 3.62 g. of methyl iodide in 50 ml. of dimethylformamide was added dropwise. The temperature was maintained between 0 and 10°. The excess of methyl iodide was removed in vacuo without heating, and the solution was poured into ice water. The aqueous phase was extracted with ether, the ether was washed with water, dried and evaporated. The residue crystallized on addition of hexane and was recrystallized from ether yielding white prisms of 7-chloro - 5 - (2 - dimethylaminophenyl)-1-methyl-3H-1,4-benzodiazepin-2(1H)-one, melting point 157–158°.

*Example 21*

A mixture of platinum oxide (1.0 g.) and 150 cc. of acetic acid was reduced at atmospheric pressure and at room temperature. To the suspension of the reduced catalyst, a solution of 9.5 g. of 7-chloro-5-(2-dimethylaminophenyl)-3H-1,4-benzodiazepin-2(1H)-one in 200 ml. of acetic acid was added and the mixture hydrogenated to completion. Filtration of the catalyst over Hy-flo, using suction and concentration of the filtrate under reduced pressure, gave a residue. The residue was recrystallized from ether to give 7-chloro-4,5-dihydro-5-(2-dimethylaminophenyl)-3H-1,4-benzodiazepin-2(1H)-one as colorless rods, M.P. 112–127°, reset 127° melting at 160–168°.

*Example 22*

A solution of 4.0 g. of 7-chloro-4,5-dihydro-5-(2-dimethylaminophenyl)-3H-1,4-benzodiazepin-2(1H)-one in 25 ml. of N,N-dimethylformamide was treated with a solution of 0.825 g. of sodium methoxide in methanol and heated on the steam bath for 10 minutes. The mixture was cooled to room temperature. 3.86 g. of methyl iodide was added and the solution was thereafter stirred at 60° for 3.5 hours and then at room temperature for 11 hours. N,N-dimethylformamide was removed under reduced pressure and the residue partitioned between benzene (100 cc.) and water (100 cc.). The aqueous phase was separated and the benzene layer was washed with water, dried over anhydrous sodium sulfate, filtered, and concentrated to an oil. The oil was exhaustively extracted with ether and filtered. Concentration of the filtrate gave 7 - chloro-4,5-dihydro-1,4 - dimethyl-5-(2-dimethylaminophenyl)-3H,1,4-benzodiazepin-2(1H)-one as an oil. 7-chloro-4,5-dihydro-1-methyl-5 - (2 - dimethylaminophenyl)-3H-1,4-benzodiazepin-2(1H)-one was formed during the reaction. It was not isolated, but was converted directly to the dimethyl compound.

The dihydrochloride salt of the above compound was prepared by dissolving the base in methanol and saturating the solution with hydrogen chloride. Evaporation of the methanol left a crystalline residue which was recrystallized from methanol to give, as white rods, 7-chloro-4,5 - dihydro-1,4-dimethyl-5-(2 - dimethylaminophenyl)-3H-1,4-benzodiazepin-2(1H)-one dihydrochloride, M.P. 152–163°.

*Example 23*

To a solution of 12 g. of 2',5-dichloro-2-nitrobenzophenone in 200 ml. of ethanol there was added a solution of app. 50 g. of dimethylamine in 100 ml. of ethanol. The mixture was heated in an autoclave under nitrogen atmosphere to 135° for 36 hours and the resulting solution concentrated in vacuo and cooled. Yellow platelets 2',5-bis(dimethylamino) - 2-nitrobenzophenone separated and were collected on a filter and after recrystallization from ethanol melted at 187–189°.

We claim:

1. A compound selected from the group consisting of compounds of the formula

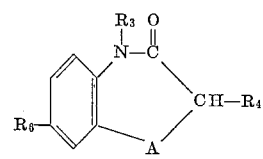

and pharmaceutically acceptable salts thereof wherein A is selected from the group consisting of

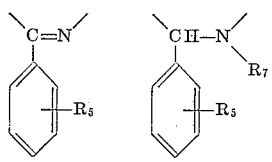

$R_3$, $R_4$ and $R_7$ are selected from the group consisting of hydrogen and lower alkyl; $R_5$ and $R_6$ are selected from the group consisting of

hydrogen, halogen, lower alkoxy, lower alkyl and trifluoromethyl; at least one of $R_5$ and $R_6$ is

and $R_1$ and $R_2$ are selected from the group consisting of, individually, lower alkyl and, taken together with the nitrogen atom, a 6-membered monoheterocyclic ring containing, at the most, one further hetero atom selected from the group consisting of nitrogen and oxygen, said further hetero atom being para to the said nitrogen atom in the ring.

2. 7-($R_1R_2N$)-5-($R_5$-phenyl)-1-$R_3$-3-$R_4$-3H-1,4-benzodiazepin-2(1H)-one wherein $R_1$ and $R_2$ are selected from the group consisting of, individually, lower alkyl and, taken together with the nitrogen atom, a 6-membered monoheterocyclic ring containing, at the most, one further hetero atom selected from the group consisting of nitrogen and oxygen, said further hetero atom being para to the said nitrogen atom in the ring; $R_3$ and $R_4$ are selected from the group consisting of hydrogen and lower alkyl and $R_5$ is selected from the group consisting of hydrogen, halogen, lower alkoxy, lower alkyl, trifluoromethyl and

3. 5-phenyl-7-piperidino-3H-1,4-benzodiazepin-2(1H)-one.
4. 7 - dimethylamino-5-phenyl-3H-1,4-benzodiazepin-2(1H)-one.
5. 7-dimethylamino-1-methyl-5-phenyl-3H-1,4-benzodiazepin-2(1H)-one.
6. 5 - (2-halophenyl)-7-dimethylamino-3H-1,4-benzodiazepin-2(1H)-one.
7. 7 - dimethylamino-5-($\alpha,\alpha,\alpha$-trifluoro-o-tolyl)-3H-1,4-benzodiazepin-2(1H)-one.
8. 5 - (2-chlorophenyl)-7-dimethylamino-1-methyl-3H-1,4-benzodiazepin-2(1H)-one.
9. 7 - $R_6$-5-($R_1R_2N$-phenyl)-1-$R_3$-3-$R_4$-3H-1,4-benzodiazepin-2(1H)-one wherein $R_3$ and $R_4$ are selected from the group consisting of hydrogen and lower alkyl; $R_6$ is selected from the group consisting of

hydrogen, halogen, lower alkoxy, lower alkyl and trifluoromethyl and $R_1$ and $R_2$ are selected from the group consisting of, individually, lower alkyl and, taken together with the nitrogen atom, a 6-membered monoheterocyclic ring containing, at the most, one further hetero atom selected from the group consisting of nitrogen and oxygen, said further hetero atom being para to the said nitrogen atom in the ring.

10. 7 - chloro-1,3-dihydro-5-(2-piperidinophenyl)-2H (1,4)-benzodiazepin-2-one.
11. 7 - halo-5-(2-dimethylaminophenyl)-3H-1,4-benzodiazepin-2(1H)-one.
12. 7 - halo-5-(2-dimethylaminophenyl)-1-methyl-3H-1,4-benzodiazepin-2(1H)-one.
13. 7 - halo - 4,5-dihydro-5-(2-dimethylaminophenyl)-3H-1,4-benzodiazepin-2(1H)-one.
14. 7 - halo - 4,5-dihydro-1,4-dimethyl-5-(2-dimethylaminophenyl)-3H-1,4-benzodiazepin-2(1H)-one.
15. A process for the preparation of compounds of claim 1 wherein $R_6$ is

which comprises the reductive alkylation of a compound of the formula

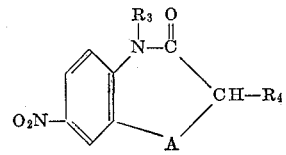

wherein A, $R_1$, $R_2$, $R_3$ and $R_4$ have the same meaning as in claim 1.

References Cited by the Examiner

UNITED STATES PATENTS 3,109,843  11/1963  Reeder et al. _____ 260—239.3
3,121,076  2/1964   Keller et al. _____ 260—239.3

WALTER A. MODANCE, *Primary Examiner.*
NICHOLAS S. RIZZO, *Examiner.*

UNITED STATES PATENT OFFICE
CERTIFICATE OF CORRECTION

Patent No. 3,218,315                            November 16, 1965

Werner Metlesics et al.

It is hereby certified that error appears in the above numbered patent requiring correction and that the said Letters Patent should read as corrected below.

Column 7, line 43, before "filter" insert -- earth --; column 13, line 10, for "-bromoaceamido" read -- -bromoacetamido --; column 14, line 38, after "platelets" insert -- of --.

Signed and sealed this 25th day of October 1966.

(SEAL)
Attest:

ERNEST W. SWIDER                            EDWARD J. BRENNER
Attesting Officer                                Commissioner of Patents